March 24, 1964   A. CEGNAR   3,126,042
PNEUMATIC TIRES
Filed Oct. 11, 1960   2 Sheets-Sheet 1

INVENTOR.
Arrigo Cegnar
BY
Stevens, Davis, Miller & Mosher
ATTORNEYS

March 24, 1964  A. CEGNAR  3,126,042
PNEUMATIC TIRES
Filed Oct. 11, 1960  2 Sheets-Sheet 2

INVENTOR.
*Arrigo Cegnar*
BY
*Stevens, Davis, Miller & Mosher*
ATTORNEYS

United States Patent Office 3,126,042
Patented Mar. 24, 1964

3,126,042
PNEUMATIC TIRES
Arrigo Cegnar, Milan, Italy, assignor to Pirelli S.p.A., Milan, Italy
Filed Oct. 11, 1960, Ser. No. 61,859
Claims priority, application Italy Oct. 15, 1959
3 Claims. (Cl. 152—361)

The present invention relates to a pneumatic tire of the type provided with an inextensible reinforcement capable of withstanding tension and disposed between the carcass and the tread, in the zone below the tread. More particularly, the present invention relates to an improvement in a tire of the type referred to above wherein there is included a layer, or layers, of textile cords located between the reinforcement and the tread.

The term "textile" as used herein should be understood to be that term as used by tire technicians to distinguish materials such as cotton, rayon, nylon and fibers constituted of other polyamides, polyesters and polyolefins from woven or knitted materials composed in whole or part of metal.

It is known in the art to provide pneumatic tires with inextensible reinforcements. Several different forms of these reinforcements are also known as are their various methods of manufacture. One form of reinforcement is composed of two or more layers of inextensible material wherein the cords are inclined with respect to the mid-circumferential plane in equal and opposite directions. However, it has been discovered, where the reinforcing structure of the latter type is composed of metallic wires or cords, that the tread tends to deform when the tire is squeezed against the ground as a result of loads imposed upon it. The reason for this effect is that, under load, a stress is created in the direction of the cords in the layer which is outermost with respect to the carcass; this stress will have a transverse component which will tend to displace the tire laterally with respect to its mid-circumferential plane.

Another type of reinforcement can be made by winding, in zig-zag fashion (see U.S. Patent No. 2,982,327, FIGURES 9 and 10), a single filiform element on the surface of a drum, or on the tire carcass itself, such that a two layer construction is formed wherein the cords, in their travel from one side of the reinforcement to the other, pass from the upper face to the lower face and vice versa. In a tire which includes the latter reinforcement, the phenomenon referred to above also takes place but with a different effect. The alternative directions of the cords in the outer face of this reinforcement serve to compensate the transverse components in one direction with those in the opposed direction so that the tire does not tend to displace laterally with respect to the mid-circumferential plane; however, the alternative stresses in opposite directions cause transverse oscillations. These oscillations, particularly at low speeds, are considerable and result in vibrations of the tire, thus creating a phenomenon analogous to the so-called "shimmy." Moreover, these vibrations can resonate with other elements or parts of the vehicle, making the steering difficult and the travel uncomfortable.

It has been discovered that the above inconvenience resulting from the vibrations caused in the tire can be eliminated by superimposing on the reinforcing armour, that is, between the reinforcement and the tread, a band of material capable of absorbing the deformations and the consequent stresses of the reinforcement so as to prevent a deformation of the tread itself. The material to be used in this band is constituted by textile cords of nonmetallic natural, artificial or synthetic material such as cotton, rayon, nylon and fibers constituted of polyamides, polyesters and polyolefins disposed in one or more layers.

In a preferred embodiment of the invention, the band is constituted by an assembly of two strips of textile cords, each strip being formed by cords parallel to one another and inclined with respect to the mid-circumferential plane of the tire and crossed with respect to the cords of the other strip. Thus, the cords of the two strips are inclined with respect to the mid-circumferential plane in equal but opposite directions and, preferably, parallel to those of the metallic cords in the underlying reinforcement.

In accordance with another embodiment of the present invention, the band is constituted of one or more superimposed strips of textile cords disposed in a prevailing longitudinal direction, i.e., essentially parallel to the mid-circumferential plane of the tire but having, however, a slight transverse waviness completely contained in the plane of the strip. The band can have a width equal to, or slightly greater than, that of the underlying metallic reinforcement but, at any event, no smaller than that of the latter.

Therefore, it is a principal object of the present invention to provide, in a tire of the type having an inextensible reinforcement formed of metallic cords as described above, a band of textile material disposed between the reinforcement and the tread and capable of absorbing the deformations and transverse stresses created by the reinforcement.

Other and further objects and advantageous features of the present invention will hereinafter more fully appear in connection with a detailed description of the drawings in which.

Figure 1:
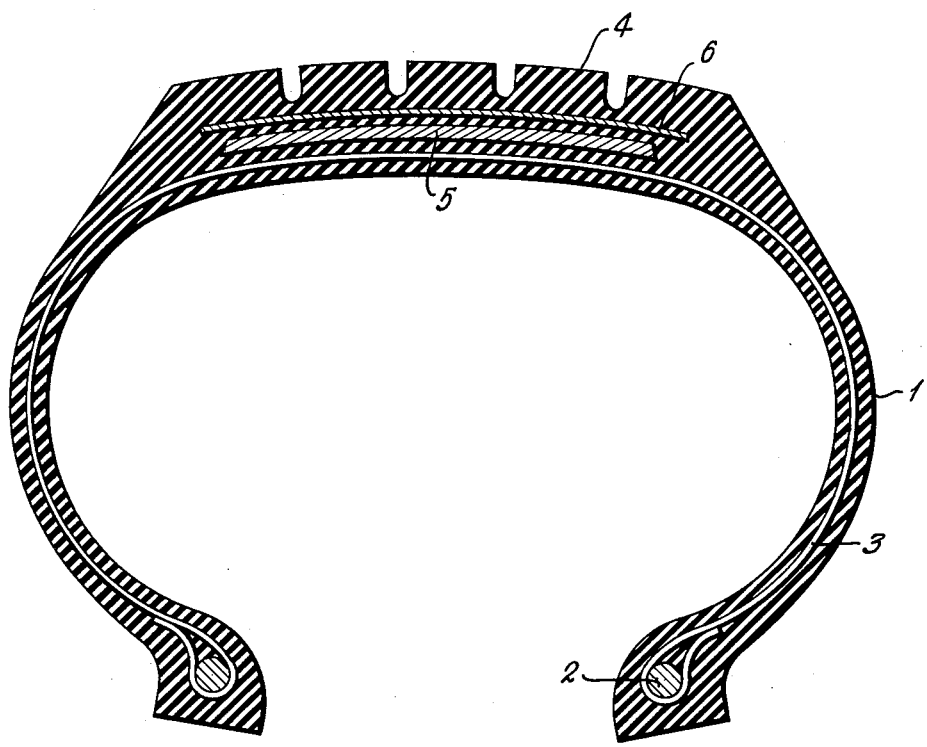
FIGURE 1 is a semi-diagrammatic cross-section of a tire constructed in accordance with the present invention, showing, principally, the relative locations of the various elements in the tire.

Referring to the drawings in detail, FIGURE 1 shows a tire 1 having bead wires 2, carcass plies 3, a tread portion 4, a metallic reinforcement 5, and a band 6 located between the reinforcement 5 and the tread 4, the latter band functioning in the manner indicated above in accordance with the basic principles of the present invention. The carcass plies 3 (shown in this figure as a single ply for the sake of simplicity) comprise one or more layers of cords which are disposed substantially in radial planes, i.e., planes passing through the rotational axis of the tire. Thus the carcass can be said to be of the "radial type." The metallic reinforcement 5 is constructed in accordance with the aforementioned Italian patent and will be formed of metallic cords which, in extending from one side of the reinforcement to the other, will pass from the upper face to the lower face and vice versa.

Figure 2:
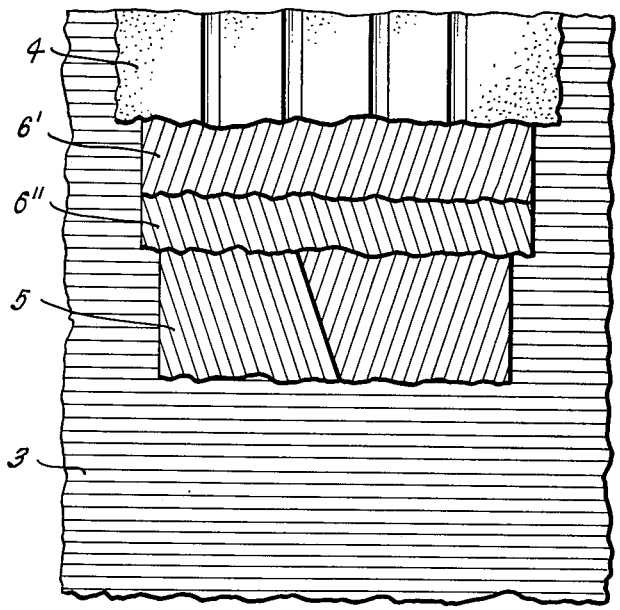
FIGURE 2 is a fragmentary plan view, developed in plane, showing the various parts of the tire constructed in accordance with one embodiment of the invention.

As shown in FIGURE 2 the reference numeral 3 designates a carcass ply having radial cords and the reference numeral 4 represents the tread portion of the tire. Located between the carcass and the tread is a metallic reinforcement 5 constructed in the maner indicated above, in accordance with the teaching of the above-mentioned patent, and formed of metallic cords disposed at equal and opposite angles with respect to the mid-circumferential plane of the tire. The band, heretofore generally designated by the reference numeral 6, is composed of two layers 6′ and 6″ comprising two plies of textile cords which together constitute the inserted band.

It can be observed from FIGURE 2 that the cords of the two layers 6′ and 6″ are disposed along two crossed directions substantially parallel to the direction of the cords in the metallic reinforcement 5. It can also be observed that the layers 6′ and 6″ have a width greater than that of the metallic reinforcement 5.

Figure 3:
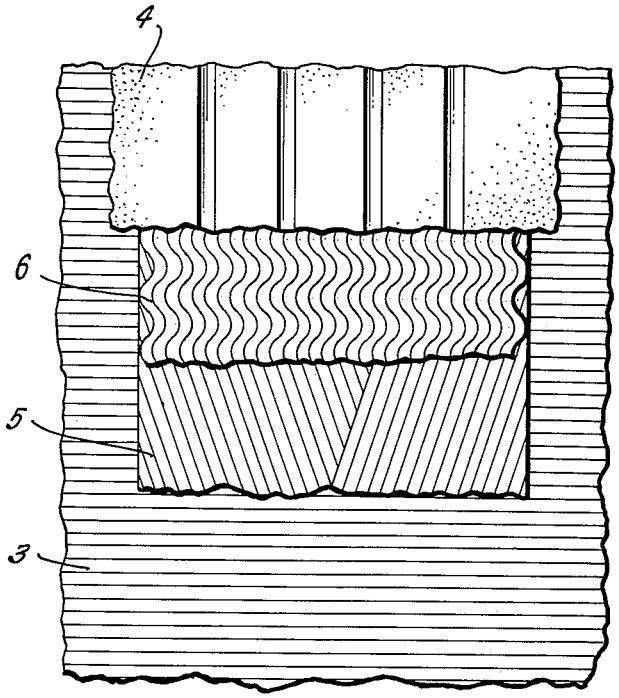
FIGURE 3 is a view similar to FIGURE 2 showing another embodiment of the present invention.

FIGURE 3 is similar to FIGURE 2; however, the band 6 is constituted by a single layer of longitudinal textile cords which have a slight transverse waviness contained in the plane of the layer. It can be observed, with respect to FIGURE 3, that the width of the band 6 is equal to that of the metallic reinforcement 5.

Whereas, the present invention has been described in particular relation to the drawings attached hereto, it should be understood that other and further modifications may be made within the spirit and scope of this invention.

What is claimed is:

1. A pneumatic tire of the type having an outer tread portion, a carcass in which the cords of the carcass plies are disposed substantially radially of the tire, and an inextensible circumferential reinforcement between the carcass and the tread portion, wherein said reinforcement is formed of metallic cords inclined at equal and opposite angles with respect to the mid-circumferential plane of the tire, said metallic cords extending back and forth from one side edge of said reinforcement to the other side thereof in zig-zag fashion, each metallic cord, as it extends from one side to the other of said reinforcement, passing from one layer into the other layer, the improvement which comprises a band having cords of textile material, which material during rotation of the tire is capable of absorbing the deformations and resultant stresses of said reinforcement whereby to prevent corresponding deformations of said tread portion, said band being located between said tread portion and said reinforcement, and said band being composed of an assembly of two layers of textile cords parallel to one another in each layer and directed along crossed and symmetrical directions with respect to the mid-circumferential plane of the tire.

2. A pneumatic tire as set forth in claim 1, wherein the textile cords of the two layers are parallel to the metallic cords in said reinforcement.

3. A pneumatic tire of the type having an outer tread portion, a carcass in which the cords of the carcass plies are disposed substantially radially of the tire, and an inextensible circumferential reinforcement between the carcass and the tread portion, wherein said reinforcement is formed of metallic cords inclined at equal and opposite angles with respect to the mid-circumferential plane of the tire, said metallic cords extending back and forth from one side edge of said reinforcement to the other side thereof in zig-zag fashion each metallic cord, as it extends from one side to the other of said reinforcement, passing from one layer into the other layer, the improvement which comprises a band having cords of textile material, which material during rotation of the tire is capable of absorbing the deformations and resultant stresses of said reinforcement whereby to prevent corresponding deformations of said tread portion, said band being located between said tread portion and said reinforcement, said band being formed of at least one layer of textile cords disposed in a prevailing longitudinal direction and having a slight transverse waviness contained in the plane of said layer.

References Cited in the file of this patent

UNITED STATES PATENTS

| 2,895,525 | Lugli | July 21, 1959 |
| 2,930,425 | Lugli et al. | Mar. 29, 1960 |
| 2,947,339 | Billingsley | Aug. 2, 1960 |
| 2,984,282 | Vittorelli | May 16, 1961 |

FOREIGN PATENTS

| 513,409 | Italy | Feb. 4, 1955 |
| 1,145,600 | France | May 6, 1957 |
| 815,055 | Great Britain | June 17, 1959 |